(12) United States Patent
Gulati et al.

(10) Patent No.: US 9,706,482 B2
(45) Date of Patent: Jul. 11, 2017

(54) METHODS AND APPARATUSES FOR DIRECT DISCOVERY IN ASYNCHRONOUS NETWORK DEPLOYMENTS

(71) Applicant: QUALCOMM Incorporated, San Diego, CA (US)

(72) Inventors: Kapil Gulati, Long Branch, NJ (US); Shailesh Patil, Bridgewater, NJ (US); Peter Gaal, San Diego, CA (US); Saurabha Rangrao Tavildar, Jersey City, NJ (US); Junyi Li, Chester, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 14/281,805

(22) Filed: May 19, 2014

(65) Prior Publication Data
US 2015/0029893 A1 Jan. 29, 2015

Related U.S. Application Data

(60) Provisional application No. 61/859,579, filed on Jul. 29, 2013.

(51) Int. Cl.
*H04W 48/16* (2009.01)
*H04W 56/00* (2009.01)
(Continued)

(52) U.S. Cl.
CPC ......... *H04W 48/16* (2013.01); *H04W 56/001* (2013.01); *H04W 72/042* (2013.01);
(Continued)

(58) Field of Classification Search
CPC ............. H04W 48/16; H04W 72/0446; H04W 56/001; H04W 72/042; H04W 8/005; H04W 48/12
See application file for complete search history.

(56) References Cited

U.S. PATENT DOCUMENTS 8,385,316 B2 2/2013 Laroia et al.
8,520,575 B2 8/2013 Doppler et al.
(Continued)

FOREIGN PATENT DOCUMENTS

CN WO 2013034017 A1 * 3/2013 ............ H04W 56/00
WO 2012170794 A1 12/2012

OTHER PUBLICATIONS

Server. Apr. 16, 2014, [online], [retrieved on Jul. 11, 2016]. Retrieved from the Internet <URL: http://techterms.com/definition/server>.*

(Continued)

*Primary Examiner* — Omar Ghowrwal
(74) *Attorney, Agent, or Firm* — Arent Fox

(57) ABSTRACT

A method, an apparatus, and a computer program product for wireless communication are provided. The apparatus receives information from a serving base station and at least one neighboring base station. The information indicates a time allocation of discovery resources allocated by each of the serving base station and the at least one neighboring base station for performing direct discovery. The apparatus further determines a subframe timing of the serving base station and the at least one neighboring base station, and performs direct discovery using the time allocation of the discovery resources allocated by each of the serving base station and the at least one neighboring base station based on a determined subframe timing of the serving base station or a neighboring base station corresponding to the discovery resources.

29 Claims, 17 Drawing Sheets

(51) Int. Cl.
H04W 72/04 (2009.01)
H04W 48/12 (2009.01)
H04W 8/00 (2009.01)

(52) U.S. Cl.
CPC ........ *H04W 72/0446* (2013.01); *H04W 8/005* (2013.01); *H04W 48/12* (2013.01)

(56) References Cited

U.S. PATENT DOCUMENTS

| | | | | |
|---|---|---|---|---|
| 2006/0146834 | A1* | 7/2006 | Baker | H04W 36/0088 370/395.53 |
| 2010/0322213 | A1* | 12/2010 | Liu | H04L 67/16 370/338 |
| 2011/0282989 | A1 | 11/2011 | Geirhofer et al. | |
| 2012/0113843 | A1 | 5/2012 | Watfa et al. | |
| 2012/0201158 | A1* | 8/2012 | Geirhofer | H04W 52/383 370/252 |
| 2012/0269115 | A1* | 10/2012 | Esteves | H04L 5/0053 370/328 |
| 2013/0066966 | A1* | 3/2013 | Patil | H04W 8/005 709/204 |
| 2013/0109301 | A1 | 5/2013 | Hakola et al. | |
| 2013/0114566 | A1* | 5/2013 | Awoniyi | H04W 36/0083 370/331 |
| 2013/0322413 | A1 | 12/2013 | Pelletier et al. | |
| 2013/0339504 | A1* | 12/2013 | Montemurro | H04W 12/06 709/223 |
| 2014/0219259 | A1* | 8/2014 | Lin | H04W 56/00 370/336 |
| 2015/0289125 | A1* | 10/2015 | Van Phan | H04W 76/023 455/434 |

OTHER PUBLICATIONS

International Search Report and Written Opinion—PCT/US2014/046163—ISA/EPO—Jan. 28, 2015.
Qualcomm Incorporated, "Techniques for D2D Discovery," R1-132503, 3GPP TSG-RAN WG1 #73, 2013, vol. RAN WG1, No. Fukuoka, Japan May 20, 2013-May 24, 2013, May 11, 2013 (May 11, 2013), XP050698211, Retrieved form the Internet < URL: http://www.3gpp.org/ftp/tsg_ran/WG1_RL1/TSGR1_73/Docs/ [retrieved on May 11, 2013], 7 Pages.
3GPP TS 25.201: "3rd Generation Partnership Project, Technical Specification Group Radio Access Network, Physical layer—General description (Release 11)," 3GPP Standard, 3rd Generation Partnership Project (3GPP), Mobile Competence Centre, 650, Route Des Lucioles, F-06921 Sophia-Antipolis Cedex, France, vol. RAN WG2, No. V11.1.0, Dec. 2012, 15 pages.
3GPP2, "Cdma2000 Wireless IP Network Standard: Simple IP and Mobile IP Access Services", 3GPP2 X.S0011-002-E, Version 1.0, Nov. 2009, pp. 1-106.
3GPP2 C.S0024-A, Version 2.0—3rd Generation Partnership Project 2; "CDMA2000 High Rate Packet Data Air Interface Specification"; Jul. 2005, 1227 pages; XP002431799.
3GPP2, "Broadcast and Multicast Service in Cdma2000 Wireless IP Network", Revision A, 3GPP2 X.S0022-A, Version 2.0, 3rd Generation Partnership Project 2 3GPP2, May 2011, pp. 1-131.
3GPP2, "Cdma2000 Wireless IP Network Standard: Data Mobility and Resource Management," 3GPP2 X.S0011-003-E , Version 1.0, Nov. 2009, pp. 1-31.
3GPP2, "Cdma2000 Wireless IP Network Standard: Introduction", 3GPP2 X.S0011-001-E, Version 1.0, Nov. 2009, pp. 1-29.
ETSI TS 125 323, "Universal Mobile Telecommunications System (UMTS); Packet Data Convergence Protocol (PDCP) specification", (3GPP TS 25.323 version 11.0.0 Release 11), Sep. 2012, pp. 1-44.
ETSI TS 125 331, "Universal Mobile Telecommunications System (UMTS); Radio Resource Control (RRC); Protocol specification", (3GPP TS 25.331 version 11.5.0 Release 11), Apr. 2013, pp. 1-2093.
ETSI TS 136 331, "LTE; Evolved Universal Terrestrial Radio Access (E-UTRA); Radio Resource Control (RRC); Protocol specification", (3GPP TS 36.331 version 10.10.0 Release 10), Jul. 2013, pp. 1-309.
IEEE 802.11 Working Group: "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE STD 802.11N-2009 (Amendment to IEEE STD 802.11-2007 as Amended by IEEE STD 802.11K-2008, IEEE STD 802.11R-2008, IEEE STD 802.11Y-2008, and IEEE STD 802.11W-2009,Oct. 29, 2009 10. ctd: )Oct. 29, 2009, pp. 1-536, XP002616237, IEEE, Piscataway, NJ, USA.
IEEE 802.15.1-2005, Part 15.1: Wireless medium access control (MAC) and physical layer (PHY) specifications for wireless personal area networks (WPANs), 2005, 600 pages.
IEEE Standard for Local and metropolitan area networks, Part 15.4: Low-Rate Wireless Personal Area Networks (LR-WPANs), IEEE Std 80215.4™ 2011, Revision of IEEE Std 802.15.4-2006, Sep. 5, 2011, pp. 1-314.
IEEE Standard for Local and Metropolitan Area Networks Part 20: Air Interface for Mobile Broadband Wireless Access Systems Supporting Vehicular Mobility Physical and Media Access Control Layer Specification, IEEE Standard 802.20-2008 Aug. 29, 2008, 1053 pages.
IEEE Standard for Wireless MAN-Advanced Air Interface for Broadband Wireless Access Systems, IEEE Standard 802.16.1-2012, Sep. 7, 2012, 1090 pages.
IEEE Std 802.15.3-2003, "IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs)", Sep. 29, 2003, 324 pages.
Postel J.B., "Internetwork Protocol Specification," Version 4, section 2.3.2.1, Sep. 1978, 41 pages.

* cited by examiner

METHODS AND APPARATUSES FOR DIRECT DISCOVERY IN ASYNCHRONOUS NETWORK DEPLOYMENTS

CROSS-REFERENCE TO RELATED APPLICATION(S)

This application claims the benefit of U.S. Provisional Application Ser. No. 61/859,579, entitled "METHODS FOR DIRECT DISCOVERY IN ASYNCHRONOUS NETWORK DEPLOYMENTS" and filed on Jul. 29, 2013, which is expressly incorporated by reference herein in its entirety.

BACKGROUND

Field

The present disclosure relates generally to communication systems, and more particularly, to enabling direct discovery among user equipments (UEs) in an asynchronous frequency division duplex (FDD) network deployment where eNodeBs are not synchronized with each other.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives information from a serving base station and at least one neighboring base station, the information indicating a time allocation of discovery resources allocated by each of the serving base station and the at least one neighboring base station for performing direct discovery, determines a subframe timing of the serving base station and the at least one neighboring base station, and performs direct discovery using the time allocation of the discovery resources allocated by each of the serving base station and the at least one neighboring base station based on a determined subframe timing of the serving base station or a neighboring base station corresponding to the discovery resources.

In another aspect of the disclosure, the apparatus reserves a time allocation of discovery resources for performing direct discovery, and sends information indicating the time allocation of the discovery resources to at least one user equipment (UE) served by the base station, wherein the information further indicates the time allocation of discovery resources allocated by at least one neighboring base station for performing direct discovery.

In a further aspect of the disclosure, the apparatus receives information from a serving base station and at least one neighboring base station, the information indicating a time allocation of discovery resources allocated by each of the serving base station and the at least one neighboring base station for performing direct discovery, determines a consensus discovery timing by synchronizing the time allocation of the discovery resources indicated by the received information with a time allocation of discovery resources of at least one other UE performing direct discovery, and performs the direct discovery based on the consensus discovery timing.

In yet another aspect of the disclosure, the apparatus reserves a time allocation of discovery resources for performing direct discovery, and sends information indicating the time allocation of the discovery resources to at least one user equipment (UE) served by the base station, wherein the discovery resources corresponding to the base station coincide with discovery resources corresponding to at least one neighboring base station, and are within one subframe of the discovery resources corresponding to the at least one neighboring base station, wherein a blank subframe precedes and follows the time allocation of the discovery resources.

DETAILED DESCRIPTION

Figure 1:
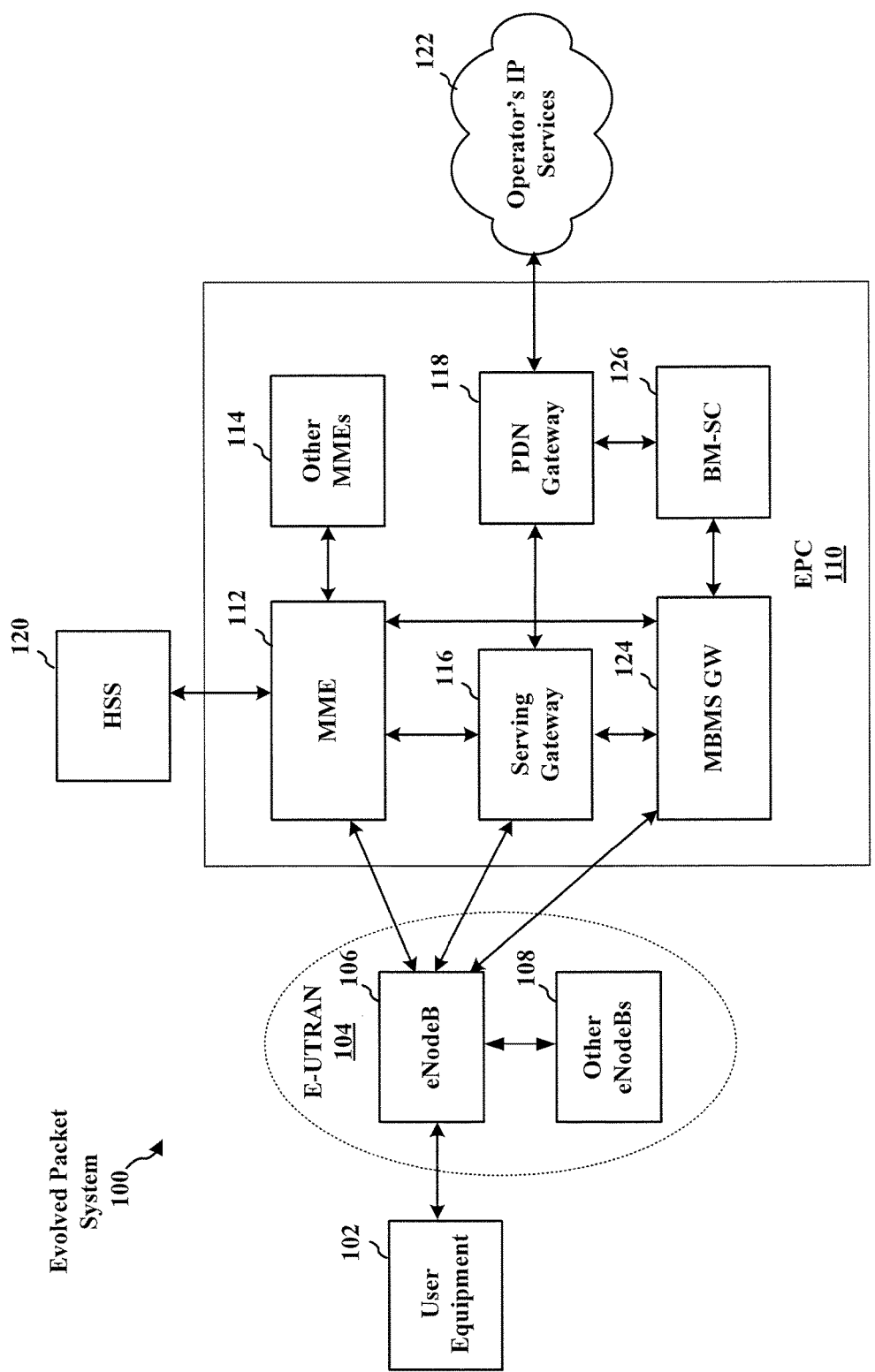
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity these entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
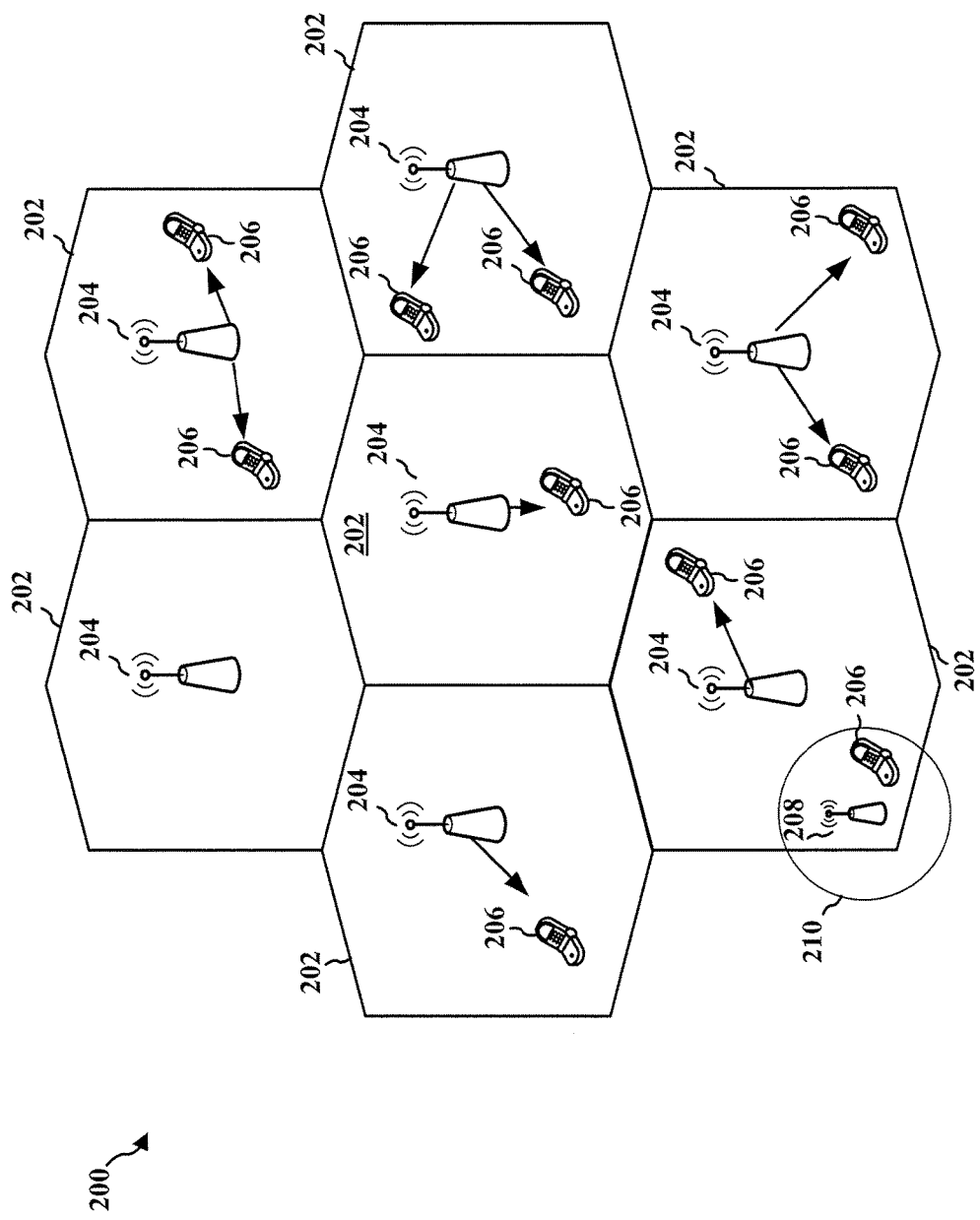
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
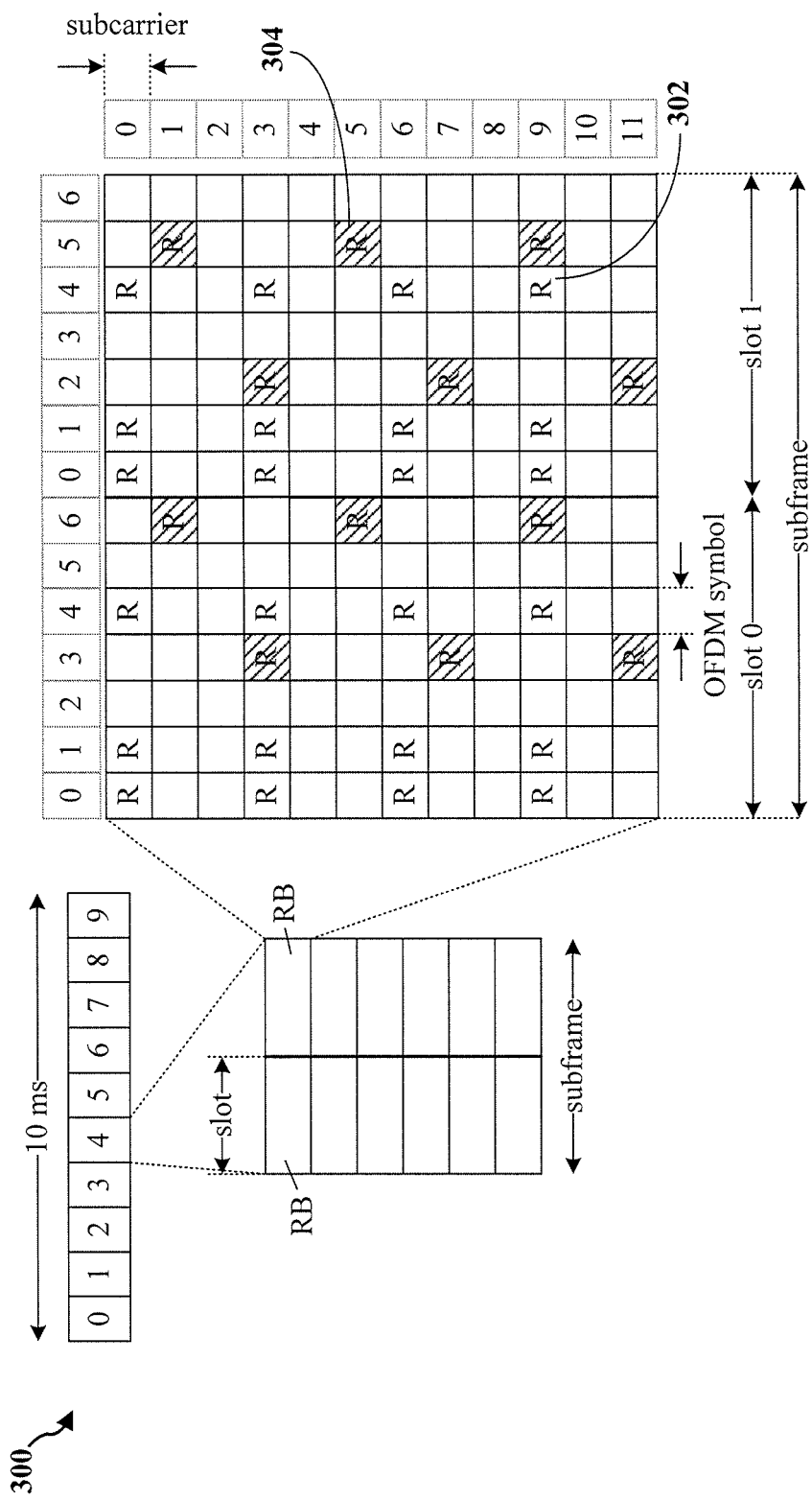
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
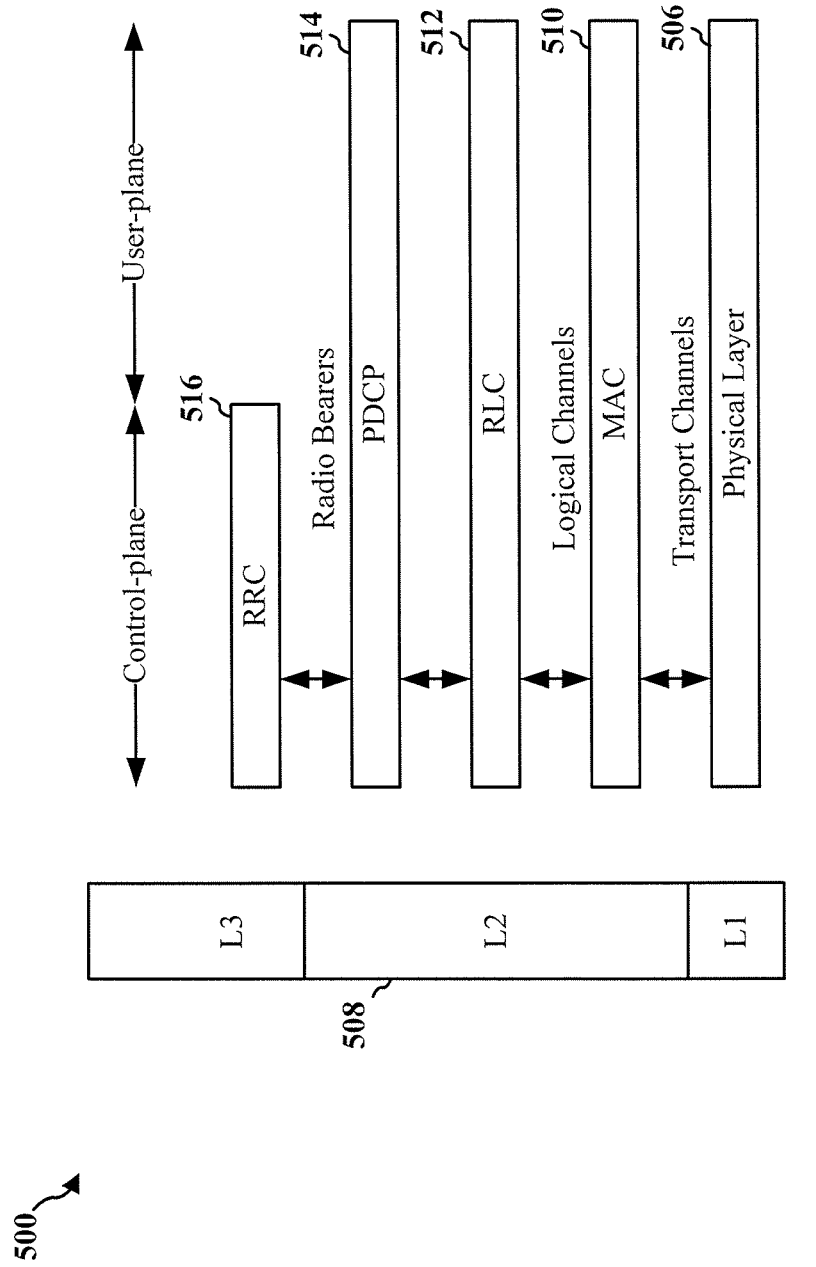
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
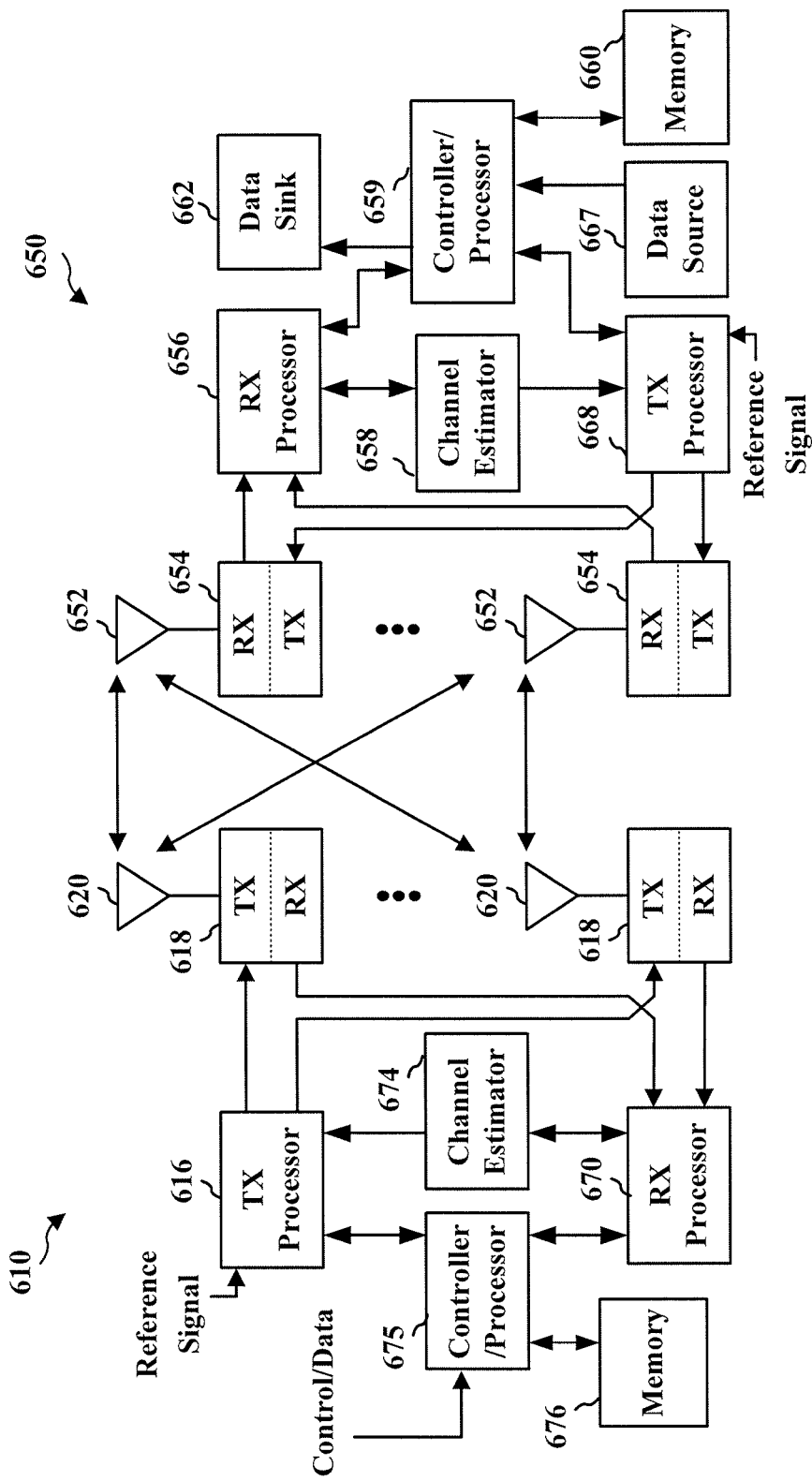
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
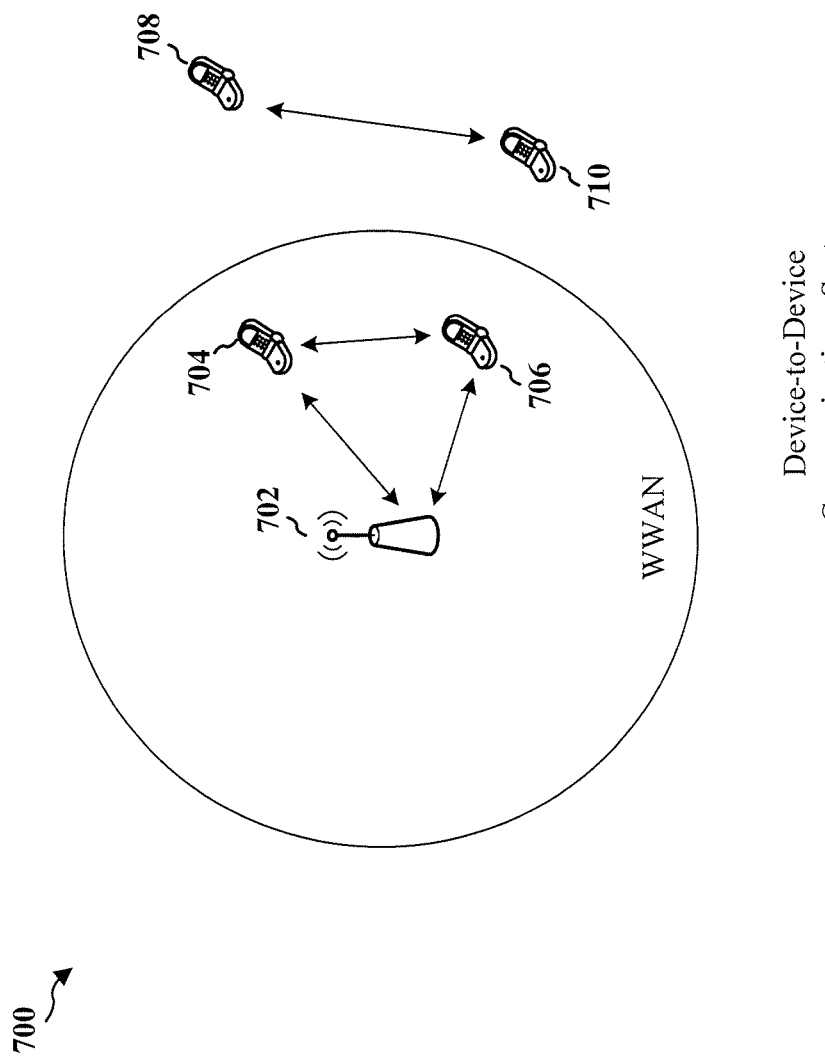
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on a wireless personal area network technology (e.g., WIMEDIA, BLUETOOTH, ZIGBEE), or a wireless local area network technology, e.g., WIFI based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In an aspect of the present disclosure, methods and apparatuses are provided for enabling UEs to perform direct discovery in an asynchronous frequency division duplex (FDD) network deployment where the eNodeBs are not synchronized with each other. Here, direct discovery refers to a discovery procedure involving direct peer-to-peer (or device-to-device) signaling without eNodeB signaling. The methods and apparatuses of the present disclosure are applicable to both intra-public land mobile network (PLMN) discovery use cases and inter-PLMN discovery use cases.

Direct discovery design previously assumed a synchronous network deployment for both time division duplex (TDD) and FDD. However, direct discovery in an asynchronous FDD network deployment may now be supported. The present disclosure provides methods for enabling reuse of existing direct discovery procedures.

To exemplify the challenges of asynchronous deployments, consider a FDD network where an eNodeB allocates a fraction of subframes for discovery on the uplink spectrum that repeats periodically (e.g., 64 subframes repeating every 10 seconds). Also consider discovery among two UEs being served by neighboring eNodeBs that belong to the same PLMN. An asynchronous deployment then presents the following challenges.

Figure 8:
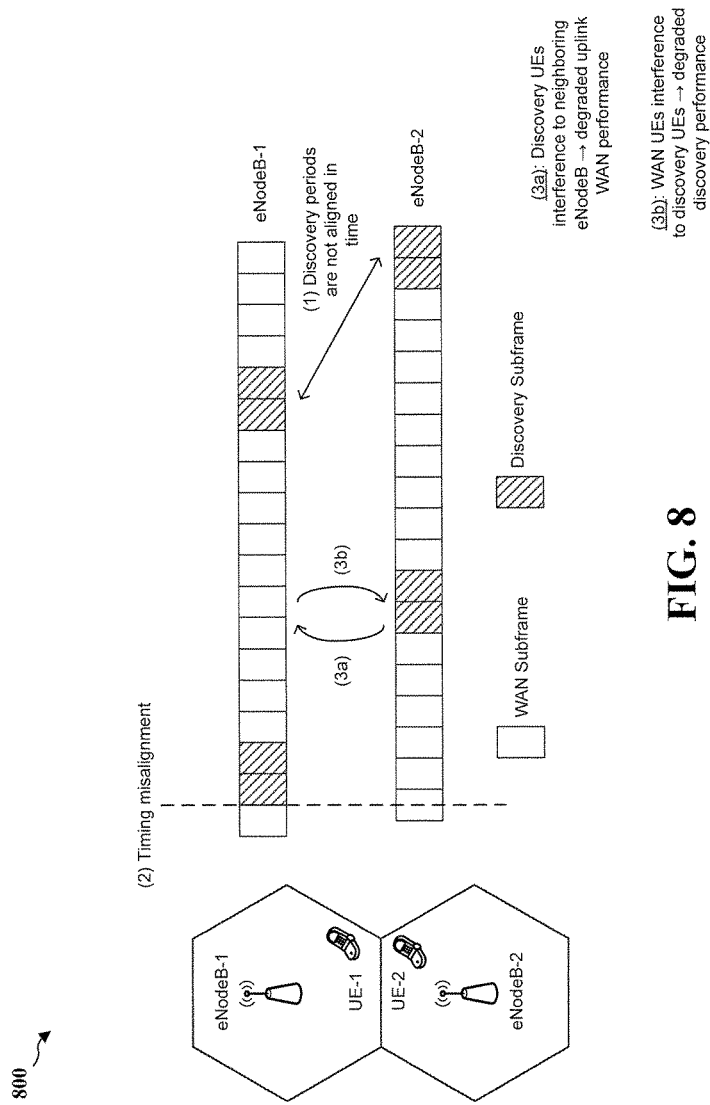
FIG. 8 is a diagram illustrating challenges related to direct discovery in asynchronous network deployments.

FIG. 8 is a diagram 800 illustrating challenges related to direct discovery in asynchronous network deployments. FIG. 8 shows an example with two eNodeBs (eNodeB-1 and eNodeB-2). A first challenge (1) relates to discovery subframes not being aligned in time. Since discovery subframes are not aligned, UEs in an RRC_IDLE mode performing discovery will have to wake twice to listen to the discovery signals. This increases power consumption at the UEs since discovery is a periodic procedure.

A second challenge (2) relates to subframe timings of the eNodeB-1 and the eNodeB-2 not being aligned. Moreover, the subframe timings may drift relative to each other with time. Referring to FIG. 8, respective subframe timings of the eNodeB-1 and the eNodeB-2 are misaligned with each other because the eNodeB-1 and the eNodeB-2 are not synchronized. In time, the respective subframe timings may further drift apart relative to each other. The misalignment is depicted as a dashed vertical line in FIG. 8. In order for a UE (e.g., UE-1) to receive discovery signals from peer UEs (e.g., UE-2) served by a neighboring eNodeB (e.g., eNodeB-2), the UE (UE-1) may detect (and track) the timing of the neighboring eNodeB (eNodeB-2).

A third challenge (3) relates to interference issues due to misalignment of discovery subframes. Referring to FIG. 8, the misalignment of discovery subframes leads to two significant interference problems (at least in the intra-PLMN case). First, referring to (3a) in FIG. 8, UEs performing discovery ("discovery UEs") impose significant interference to neighboring eNodeBs since discovery transmissions are not power controlled. This results in degraded uplink wide area network (WAN) performance at the neighboring eNodeBs. Second, referring to (3b) in FIG. 8, discovery transmissions (of the discovery UEs) suffer interference from UEs of the neighboring eNodeBs performing WAN transmissions ("WAN UEs"). This results in degraded discovery performance at the discovery UEs.

Figure 9:
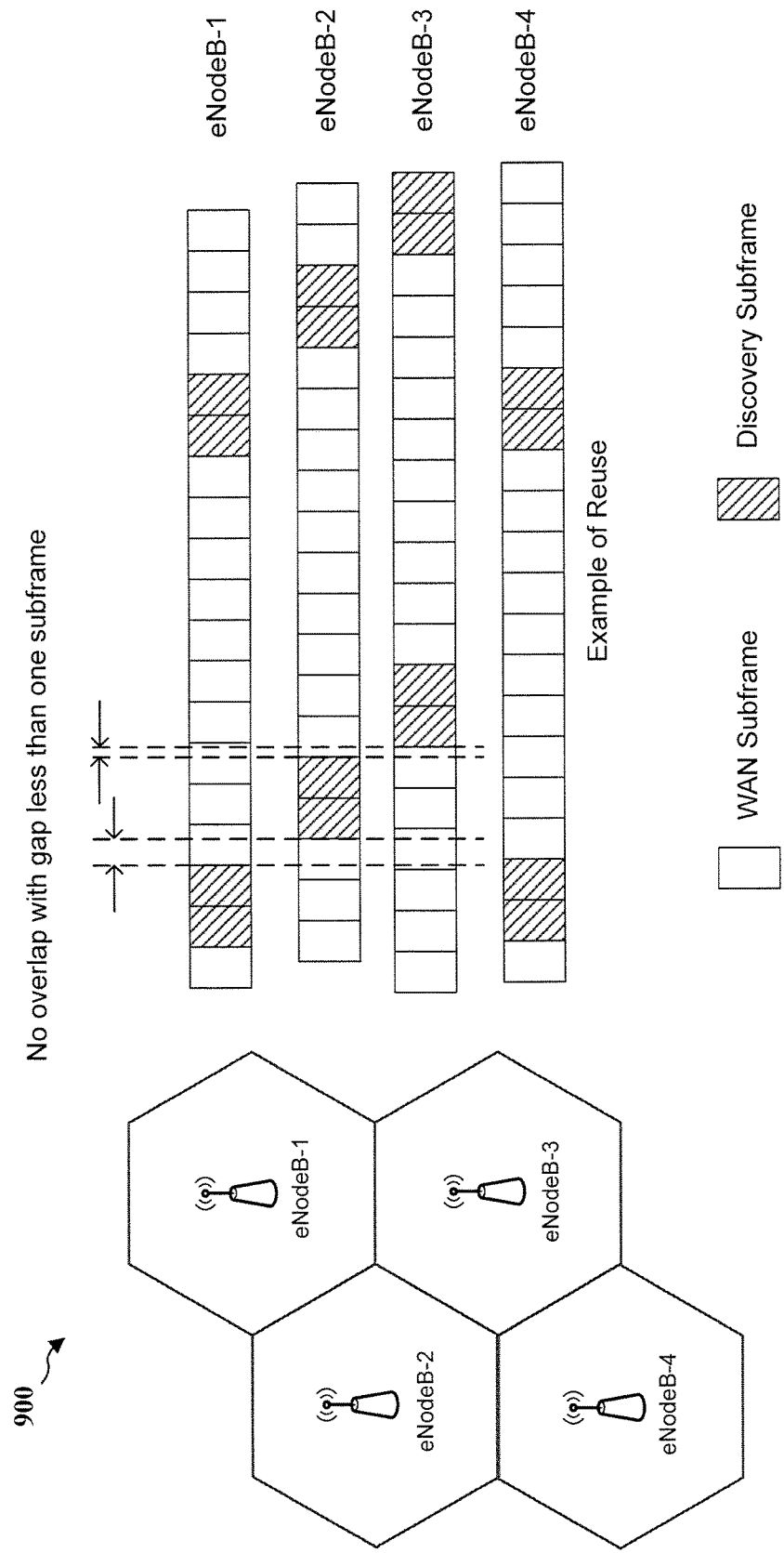
FIG. 9 is a diagram illustrating an exemplary allocation of discovery subframes across eNodeBs according to an embodiment.

FIG. 9 is a diagram 900 illustrating an exemplary allocation of discovery subframes across eNodeBs according to an embodiment. Referring to FIG. 9, discovery resources of neighboring eNodeBs are time-adjacent to each other and non-overlapping. Here, it is not necessary for a "neighboring eNodeB" to be directly adjacent to another eNodeB. For example, as shown in FIG. 9, eNodeB-1 is considered a neighbor to eNodeB-4, and vice versa, although the eNodeB-1 and the eNodeB-4 are not directly adjacent to each other. A UE may wake once and rotate through (e.g., listen to in a sequential manner) discovery periods of a serving eNodeB and neighboring eNodeBs. The UE transmits discovery signals using WAN timing. Hence, the UE may track the timing of all neighboring eNodeBs in conjunction with the serving eNodeB.

To overcome the first challenge (1), an eNodeB may reserve a discovery resource that is time-adjacent, non-overlapping, and within one subframe, of a neighboring eNodeB's discovery resource. The time allocation of discovery resources may follow a reuse pattern across the deployment, e.g., as shown in FIG. 9 wherein the eNodeB-4 reuses discovery resources previously allocated to the eNodeB-1. An eNodeB may broadcast (as a part of a system information block (SIB)) to all UEs the eNodeB serves, the eNodeB's own time allocation of discovery resources as well as the time allocation of neighboring eNodeBs.

To overcome the second challenge (2), the UE may detect and track the timing of all neighboring eNodeBs, in addition to the UE's serving eNodeB. The UE may listen on discovery resources for the serving eNodeB and neighboring eNodeBs (for which the timing was previously detected) by aligning the detected timing with an eNodeB corresponding to the discovery resource. The UE may rotate through the discovery resources according to the time pattern of allocation. The UE may also rotate through the multiple timing hypotheses being tracked. For example, referring to FIG. 9, the UE may listen on the discovery resources of the eNodeB-1 and thereafter listen on the discovery resources of the eNodeB-4, which has a similar (or same) time allocation as the discovery resources of the eNodeB-1.

An eNodeB may adjust the discovery subframe allocation to compensate for timing drifts over time. This ensures that the discovery resources remain non-overlapping and within one subframe of neighboring eNodeBs' discovery resources. The timing drift may be detected according to one or more of the following: 1) Detected via eNodeB-to-eNodeB signaling over a network backhaul (e.g., using time precision protocols); 2) Detected by the eNodeB via over-the-air timing synchronization signals transmitted by neighboring eNodeBs; and 3) Detected by UEs and the UEs send a timing drift report to a serving eNodeB, wherein the serving eNodeB estimates the timing drift by consolidating the reports from the UEs.

To overcome the third challenge (3), in an aspect, an eNodeB may refrain from scheduling a UE performing a WAN transmission (WAN UE) in resources (e.g., subframes) that overlap/collide with the discovery resources (e.g., discovery subframes) of a neighboring eNodeB. In another aspect, the eNodeB may schedule a WAN UE in resources that overlap/collide with the discovery resources of the neighboring eNodeB if the WAN UE is in close proximity to the eNodeB. In addition, the eNodeB may power control the scheduled WAN UE to transmit at a power sufficient to compensate for interference from neighboring UEs performing direct discovery.

Figure 10:
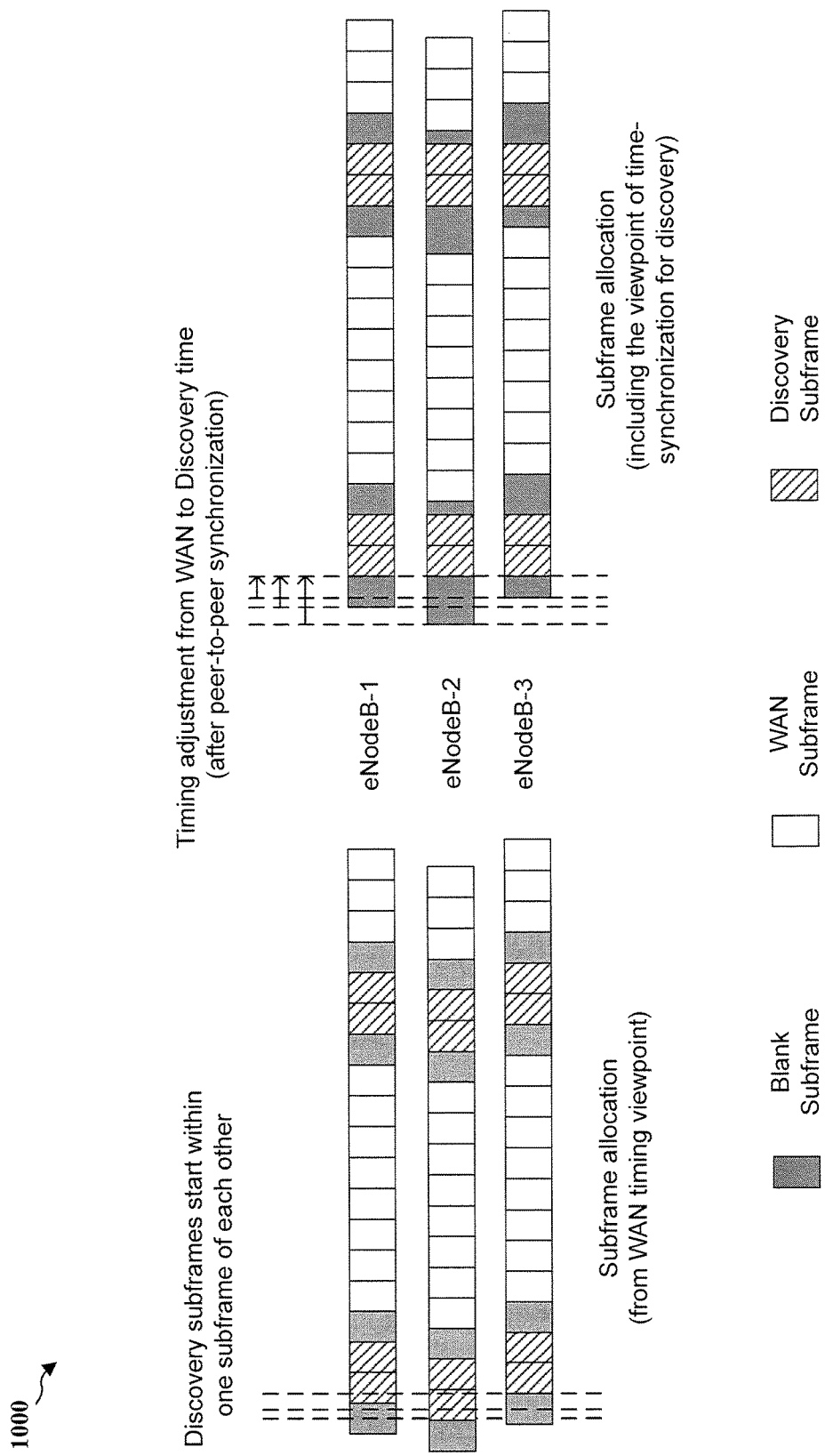
FIG. 10 is a diagram illustrating an exemplary allocation of discovery subframes across eNodeBs according to an embodiment.

FIG. 10 is a diagram 1000 illustrating an exemplary allocation of discovery subframes across eNodeBs according to an embodiment. Referring to FIG. 10, discovery resources of all neighboring eNodeBs roughly coincide with each other, and are within one subframe of each other. An eNodeB may allocate one blank subframe both before and after the discovery period. A discovery procedure may then follow as if UEs experience out-of-network coverage. In particular, discovery transmissions are not performed according to eNodeB timing. Rather, the discovery transmissions are performed based on a consensus timing among UEs in the network (across eNodeBs) performing discovery. A UE may adjust from a eNodeB timing to a consensus discovery subframe timing during the discovery period. Timing adjustment is made possible by the blank subframe allocated before and after the discovery period.

To overcome the first challenge (1) and the third challenge (3), an eNodeB may reserve discovery resources to approximately coincide with discovery resources of neighboring eNodeBs. The eNodeB may further ensure that the reserved discovery resources are within one subframe of the discovery resources of the neighboring eNodeBs. Also, the eNodeB may reserve one subframe before and after the discovery resources (discovery subframes) as a blank subframe, wherein the blank subframe is a subframe where no WAN operation or discovery operation occurs.

To overcome the second challenge (2), a UE participating in discovery may time align the UE's discovery subframes with discovery subframes of other peer UEs by performing peer-to-peer timing synchronization with the other peer UEs. The time-aligned discovery subframes may be referred to as a consensus discovery timing. UEs may adjust from a respective WAN timing to the consensus discovery timing when transitioning from respective WAN resources to the discovery resources. The UEs may transmit and receive the discovery signals using the discovery timing.

The eNodeB of FIG. 10 may adjust the discovery subframe allocation to compensate for timing drifts over time. This ensures that the discovery resources of all neighboring eNodeBs roughly coincide with each other, and are within one subframe of each other. The timing drift may be detected according to one or more of the following: 1) eNodeB-to-eNodeB signaling over a network backhaul (e.g., using time precision protocols); 2) Detected by eNodeB via over-the-air timing synchronization signals transmitted by neighboring eNodeBs; and 3) Detected by UEs and the UEs send a timing drift report to a serving eNodeB, wherein the serving eNodeB estimates the timing drift by consolidating the reports from the UEs.

In the operations described above, continual eNodeB coordination is needed with respect to adjusting the discovery subframe allocation to compensate for timing drifts. In an aspect, the present disclosure also provides for an operation that does not require continual eNodeB coordination. Here, eNodeBs may freely and independently allocate discovery subframes. Moreover, an eNodeB may broadcast (e.g., as a part of a system information block (SIB)) to all UEs the eNodeB serves, the eNodeB's own time allocation of discovery resources as well as the time allocation of neighboring eNodeBs.

To overcome the second challenge (2), a UE may track the discovery resources/subframes (timing) of all neighboring eNodeBs in addition to the UE's serving eNodeB. In an aspect, the timing is derived from downlink synchronization signals broadcast by a neighboring eNodeB. In another aspect, the timing is derived from discovery transmissions from UEs that belong to the neighboring eNodeB. The UE may listen on the discovery resources of the serving eNodeB and the neighboring eNodeBs for which the timing was derived by aligning the timing with the eNodeB that owns the discovery resource.

The operations described above assumed that the eNodeBs belong to the same public land mobile network (PLMN) (intra-PLMN discovery). In an aspect, the present disclosure may be extended to inter-PLMN discovery. In case of inter-PLMN discovery, uplink and downlink spectrums may be different, thus interference between WAN and discovery operations may occur. Also, while the term "neighboring" eNodeBs may be used in the present disclosure, the eNodeBs may be co-located for inter-PLMN.

In inter-PLMN, an eNodeB may broadcast (as a part of a system information block (SIB)), a spectrum used by neighboring eNodeBs that belong to a PLMN different from the PLMN of the eNodeB. A UE may tune to a downlink spectrum of a neighboring eNodeB while listening for timing synchronization from the eNodeB. Moreover, the UE may tune to an uplink spectrum of the neighboring eNodeB while listening for discovery transmissions from UEs associated with the eNodeB.

Figure 11:
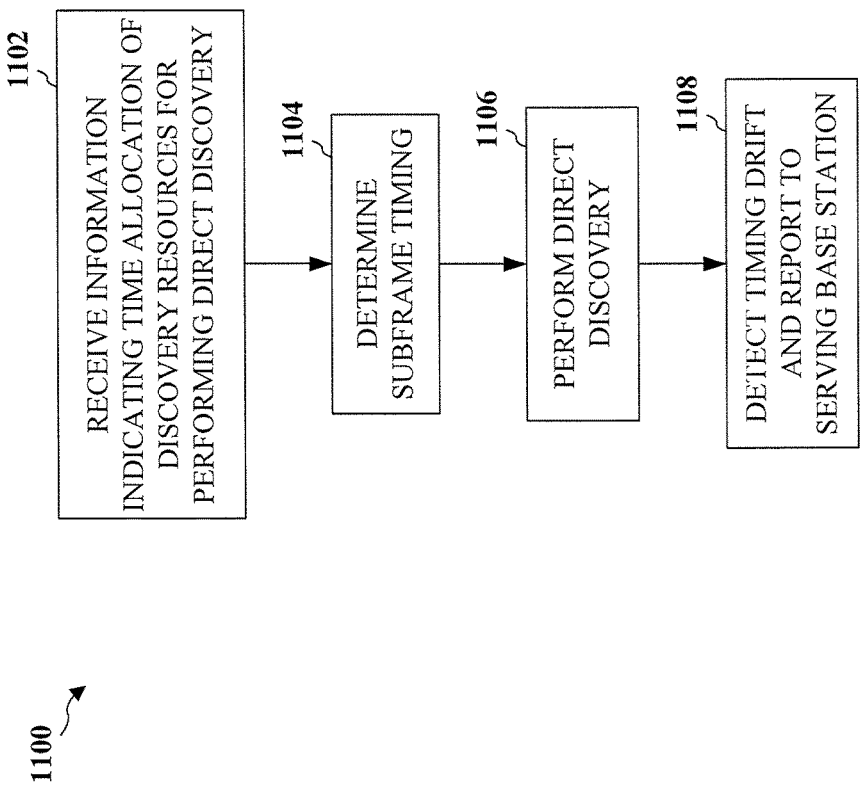
FIG. 11 is a flow chart of a method of wireless communication.

FIG. 11 is a flow chart 1100 of a method of wireless communication. The method may be performed by a UE. At step 1102, the UE receives information from a serving base station and at least one neighboring base station. The information may indicate a time allocation of discovery resources allocated by each of the serving base station and the at least one neighboring base station for performing direct discovery. The discovery resources corresponding to a base station may be time-adjacent, non-overlapping, and within one subframe of the discovery resources corresponding to a neighboring base station. Additionally, or alternatively, the time allocation of the discovery resources corresponding to a base station may be the same as the time allocation of the discovery resources corresponding to a neighboring base station.

At step 1104, the UE determines a subframe timing of the serving base station and the at least one neighboring base station. The subframe timing may be determined based on downlink synchronization signals broadcast by the at least one neighboring base station. In an aspect, the UE may tune to a downlink frequency spectrum of the at least one neighboring base station when determining the subframe timing of the at least one neighboring base station. Additionally or alternatively, the subframe timing may be determined based on a transmission from one or more UEs performing direct discovery, wherein the one or more UEs are served by the at least one neighboring base station.

At step 1106, the UE performs direct discovery using the time allocation of the discovery resources allocated by each of the serving base station and the at least one neighboring base station based on a determined subframe timing of the serving base station or a neighboring base station corresponding to the discovery resources. In an aspect, the UE may tune to an uplink frequency spectrum of the at least one neighboring base station when performing the direct discovery for one or more UEs served by the at least one neighboring base station. The UE may wake once to perform the direct discovery using each of the allocated discovery resources in a sequential manner according to the time allocation of each of the allocated discovery resources. Additionally or alternatively, the UE may wake once to perform the direct discovery using each of the allocated discovery resources having the same time allocation in a sequential manner.

At step 1108, the UE detects a timing drift between the time allocation of the discovery resources corresponding to a base station and the time allocation of the discovery resources corresponding to a neighboring base station. Thereafter, the UE reports the timing drift to the serving base station.

Figure 12:
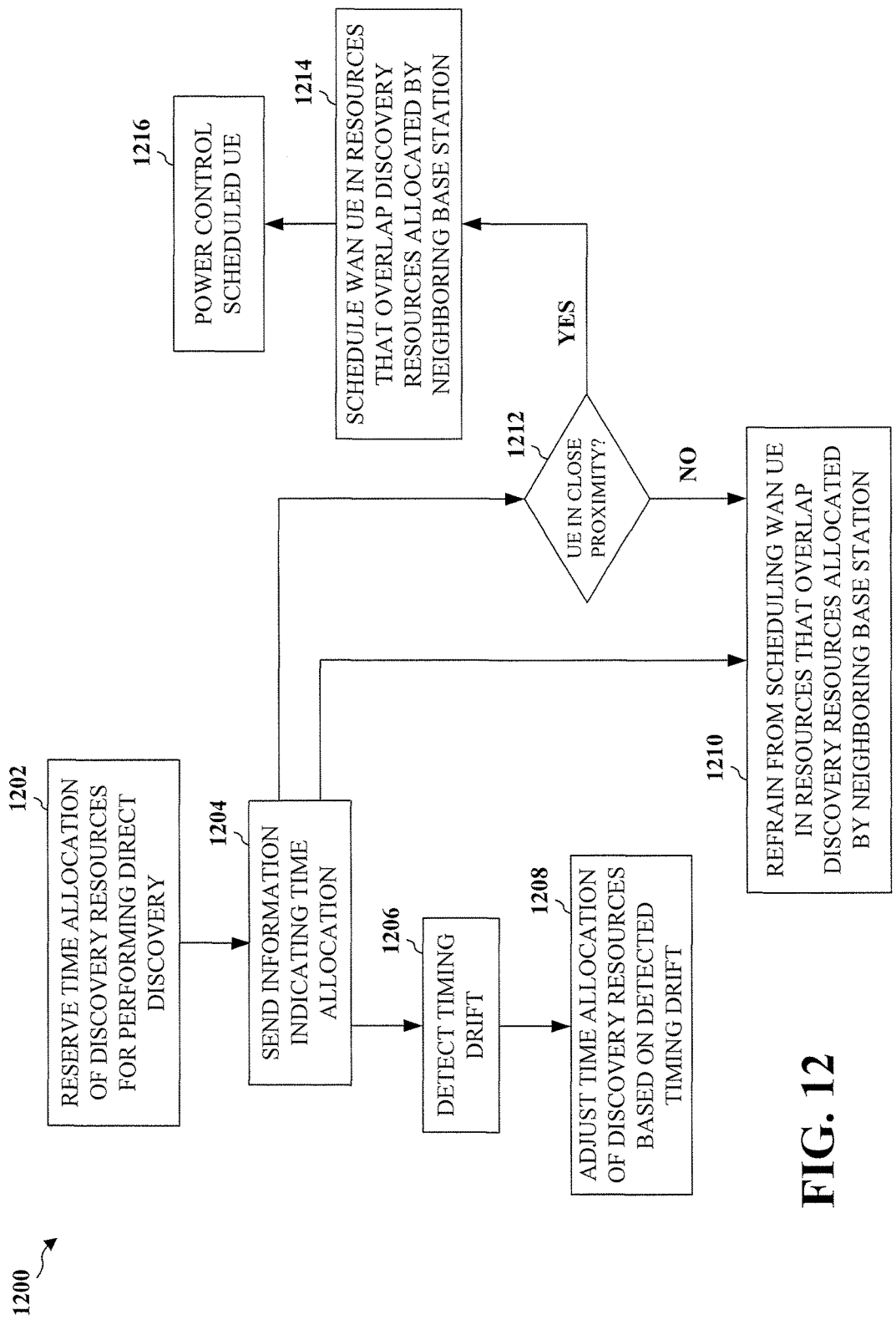
FIG. 12 is a flow chart of a method of wireless communication.

FIG. 12 is a flow chart 1200 of a method of wireless communication. The method may be performed by a base station or eNodeB (eNB). At step 1202, the base station reserves a time allocation of discovery resources for use by at least one UE to perform direct discovery. The discovery resources corresponding to the base station may be time-adjacent, non-overlapping, and within one subframe of discovery resources corresponding to a neighboring base station. Alternatively, the discovery resources corresponding to the base station may coincide with discovery resources corresponding to at least one neighboring base station and may be within one subframe of the discovery resources corresponding to the at least one neighboring base station. A blank subframe may precede and follow the time allocation of the discovery resources. In an aspect, the time allocation of the discovery resources corresponding to the base station may also be the same as the time allocation of the discovery resources corresponding to a neighboring base station.

At step 1204, the base station sends information indicating the time allocation of the discovery resources to the at least one UE served by the base station. The information may further indicate the time allocation of discovery resources allocated by at least one neighboring base station for performing direct discovery. The information may also indicate a frequency spectrum used by the at least one neighboring base station belonging to a public land mobile network (PLMN) different from a PLMN of the base station.

In an aspect, at step 1206, the base station may detect a timing drift between the time allocation of the discovery resources corresponding to the base station and the time allocation of the discovery resources corresponding to a neighboring base station. The timing drift may be detected by receiving timing information from a neighboring base station via a network backhaul, receiving a synchronization signal from the neighboring base station via an over-the-air signal, and/or receiving a timing drift report from a UE served by the base station. At step 1208, the base station may adjust the time allocation of the discovery resources corresponding to the base station based on the detected timing drift.

In a further aspect, at step 1210, the base station may refrain from scheduling a UE performing a wide area network (WAN) operation in resources that overlap with the discovery resources allocated by the at least one neighboring base station. Alternatively, at step 1212, the base station may first determine if a UE is in close proximity to the base station. Based on a negative result, the base station may proceed to step 1210 and refrain from scheduling the UE.

At step 1214, when the UE is in close proximity to the base station, the base station may schedule the UE performing the WAN operation in the resources that overlap with the discovery resources allocated by the at least one neighboring base station. At step 1216, the base station may power control the scheduled UE to transmit at a power sufficient to compensate for interference from UEs performing direct discovery.

Figure 13:
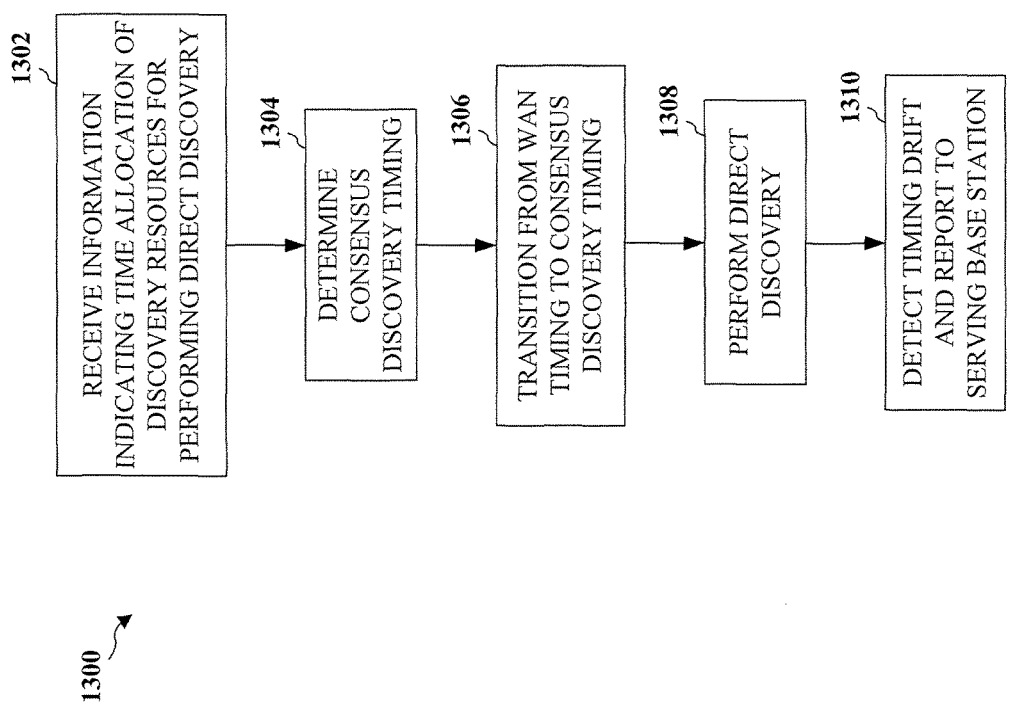
FIG. 13 is a flow chart of a method of wireless communication.

FIG. 13 is a flow chart 1300 of a method of wireless communication. The method may be performed by a UE. At step 1302, the UE receives information from a serving base station and at least one neighboring base station. The information may indicate a time allocation of discovery resources allocated by each of the serving base station and the at least one neighboring base station for performing direct discovery. The discovery resources corresponding to the serving base station may coincide with discovery resources corresponding to at least one neighboring base station and may be within one subframe of the discovery resources corresponding to the at least one neighboring base station. A blank subframe may precede and follow the time allocation of the discovery resources.

At step 1304, the UE determines a consensus discovery timing by synchronizing the time allocation of the discovery resources indicated by the received information with a time allocation of discovery resources of at least one other UE performing direct discovery. At step 1306, the UE may transition from a timing for performing a WAN operation to the consensus discovery timing when transitioning from a WAN resource to the discovery resources.

At step 1308, the UE performs the direct discovery based on the consensus discovery timing. The UE may wake once according to the consensus discovery timing to perform the direct discovery using the discovery resources corresponding to the serving base station and the at least one neighboring base station. In an aspect, the UE may tune to an uplink frequency spectrum of the at least one neighboring base station when performing the direct discovery for at least one UE served by the at least one neighboring base station. In a further aspect, the UE may tune to a downlink frequency spectrum of the at least one neighboring base station when determining a subframe timing of the at least one neighboring base station.

At step 1310, the UE detects a timing drift between the time allocation of the discovery resources corresponding to a base station and the time allocation of the discovery resources corresponding to a neighboring base station. Thereafter, the UE reports the timing drift to the serving base station.

Figure 14:
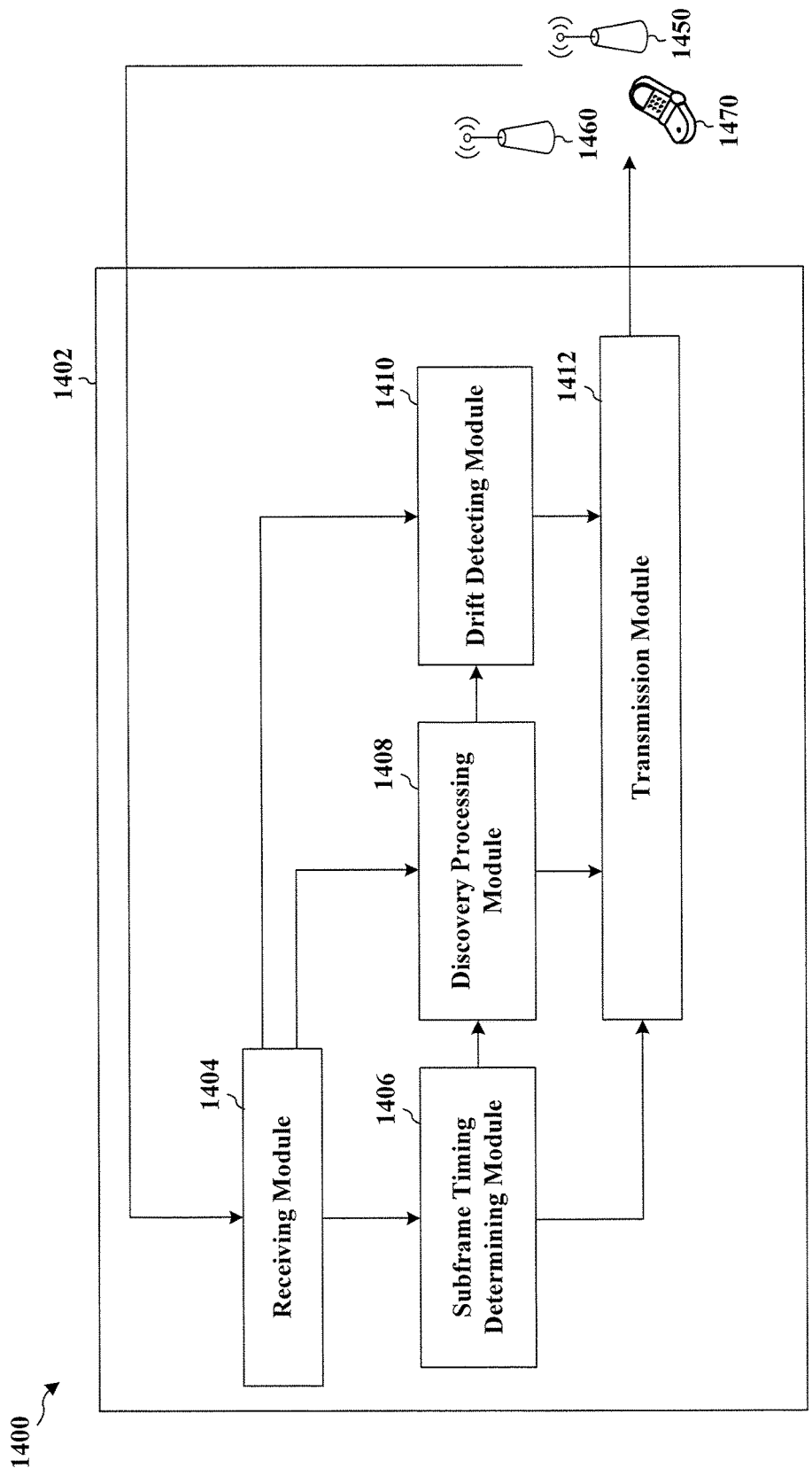
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a receiving module 1404, a subframe timing determining module 1406, a discovery processing module 1408, a drift detecting module 1410, and a transmission module 1412.

The receiving module 1404 receives information from a serving base station 1450 and at least one neighboring base station 1460. The information may indicate a time allocation of discovery resources allocated by each of the serving base station 1450 and the at least one neighboring base station 1460 for performing direct discovery. The discovery resources corresponding to a base station may be time-adjacent, non-overlapping, and within one subframe of the discovery resources corresponding to a neighboring base station. Additionally, or alternatively, the time allocation of the discovery resources corresponding to a base station may be the same as the time allocation of the discovery resources corresponding to a neighboring base station.

The subframe timing determining module 1406 determines a subframe timing of the serving base station 1450 and the at least one neighboring base station 1460. The subframe timing may be determined based on downlink synchronization signals broadcast by the at least one neighboring base station 1460. In an aspect, the subframe timing determining module 1406 may tune to a downlink frequency spectrum of the at least one neighboring base station 1460 when determining the subframe timing of the at least one neighboring base station 1460. Additionally or alternatively, the subframe timing may be determined based on a transmission from one or more UEs (e.g., UE 1470) performing direct discovery, wherein the one or more UEs are served by the at least one neighboring base station 1460.

The discovery processing module 1408 performs direct discovery using the time allocation of the discovery resources allocated by each of the serving base station 1450 and the at least one neighboring base station 1460 based on a determined subframe timing of the serving base station 1450 or a neighboring base station 1460 corresponding to the discovery resources. In an aspect, the discovery processing module 1408 may tune to an uplink frequency spectrum of the at least one neighboring base station 1460 when performing the direct discovery for one or more UEs (e.g., UE 1470) served by the at least one neighboring base station 1460. The apparatus 1402 may wake once to perform the direct discovery using each of the allocated discovery resources in a sequential manner according to the time allocation of each of the allocated discovery resources. Additionally or alternatively, the apparatus 1402 may wake once to perform the direct discovery using each of the allocated discovery resources having the same time allocation in a sequential manner.

The drift detecting module 1410 detects a timing drift between the time allocation of the discovery resources corresponding to a base station and the time allocation of the discovery resources corresponding to a neighboring base station. Thereafter, the drift detecting module 1410 reports the timing drift to the serving base station 1450 via the transmission module 1412.

In an aspect, the discovery resources corresponding to the serving base station 1450 may coincide with discovery resources corresponding to at least one neighboring base station 1460 and may be within one subframe of the discovery resources corresponding to the at least one neighboring base station 1460. A blank subframe may precede and follow the time allocation of the discovery resources. The discovery processing module 1408 may determine a consensus discovery timing by synchronizing the time allocation of the discovery resources indicated by the received information with a time allocation of discovery resources of at least one other UE (e.g., UE 1470) performing direct discovery. The discovery processing module 1408 may transition the apparatus 1402 from a timing for performing a WAN operation to the consensus discovery timing when the apparatus 1402 transitions from a WAN resource to the discovery resources.

The discovery processing module 1408 may perform the direct discovery based on the consensus discovery timing. The apparatus 1402 may wake once according to the consensus discovery timing to perform the direct discovery using the discovery resources corresponding to the serving base station 1450 and the at least one neighboring base station 1460. In an aspect, the discovery processing module 1408 may tune to an uplink frequency spectrum of the at least one neighboring base station 1460 when performing the direct discovery for at least one UE (e.g., UE 1470) served by the at least one neighboring base station 1460. In a further aspect, the subframe timing determining module

1406 may tune to a downlink frequency spectrum of the at least one neighboring base station 1460 when determining a subframe timing of the at least one neighboring base station 1460.

The apparatus may include additional modules that perform each of the steps of the algorithm in the aforementioned flow charts of FIGS. 11 and 13. As such, each step in the aforementioned flow charts of FIGS. 11 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
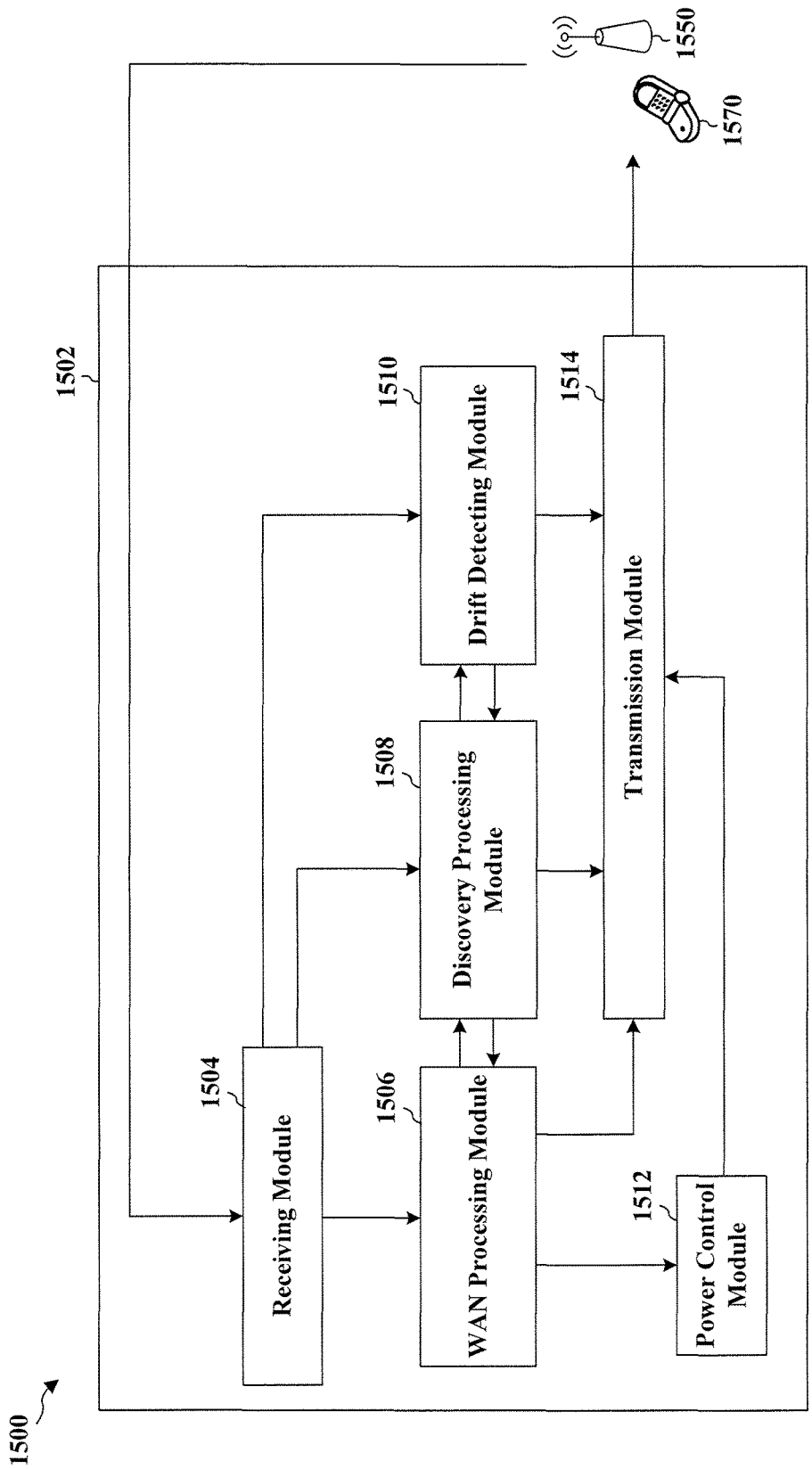
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a base station or eNodeB (eNB). The apparatus 1502 includes a receiving module 1504, a WAN processing module 1506, a discovery processing module 1508, a drift detecting module 1510, a power control module 1512, and a transmission module 1514.

The discovery processing module 1508 reserves a time allocation of discovery resources for use by at least one UE (e.g., UE 1570) to perform direct discovery. The discovery resources corresponding to the base station 1502 may be time-adjacent, non-overlapping, and within one subframe of discovery resources corresponding to a neighboring base station 1550. Alternatively, the discovery resources corresponding to the base station 1502 may coincide with discovery resources corresponding to at least one neighboring base station 1550 and may be within one subframe of the discovery resources corresponding to the at least one neighboring base station 1550. A blank subframe may precede and follow the time allocation of the discovery resources. In an aspect, the time allocation of the discovery resources corresponding to the base station 1502 may also be the same as the time allocation of the discovery resources corresponding to a neighboring base station 1550.

The discovery processing module 1508 sends (via the transmission module 1514) information indicating the time allocation of the discovery resources to the at least one UE (e.g., UE 1570) served by the base station 1502. The information may further indicate the time allocation of discovery resources allocated by at least one neighboring base station 1550 for performing direct discovery. The information may also indicate a frequency spectrum used by the at least one neighboring base station 1550 belonging to a public land mobile network (PLMN) different from a PLMN of the base station 1502.

The drift detecting module 1510 may detect a timing drift between the time allocation of the discovery resources corresponding to the base station 1502 and the time allocation of the discovery resources corresponding to a neighboring base station 1550. The timing drift may be detected by receiving timing information from a neighboring base station 1550 via a network backhaul, receiving a synchronization signal from the neighboring base station 1550 via an over-the-air signal, and/or receiving a timing drift report from a UE 1570 served by the base station. The discovery processing module 1508 may adjust the time allocation of the discovery resources corresponding to the base station 1502 based on the detected timing drift.

The WAN processing module 1506 may refrain from scheduling a UE performing a wide area network (WAN) operation in resources that overlap with the discovery resources allocated by the at least one neighboring base station 1550. Alternatively, the WAN processing module 1506 may first determine if a UE is in close proximity to the base station 1502. Based on a negative result, the WAN processing module 1506 may refrain from scheduling the UE.

When the UE is in close proximity to the base station 1502, the WAN processing module 1506 may schedule the UE performing the WAN operation in the resources that overlap with the discovery resources allocated by the at least one neighboring base station 1550. The power control module 1512 may power control the scheduled UE to transmit at a power sufficient to compensate for interference from UEs performing direct discovery.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
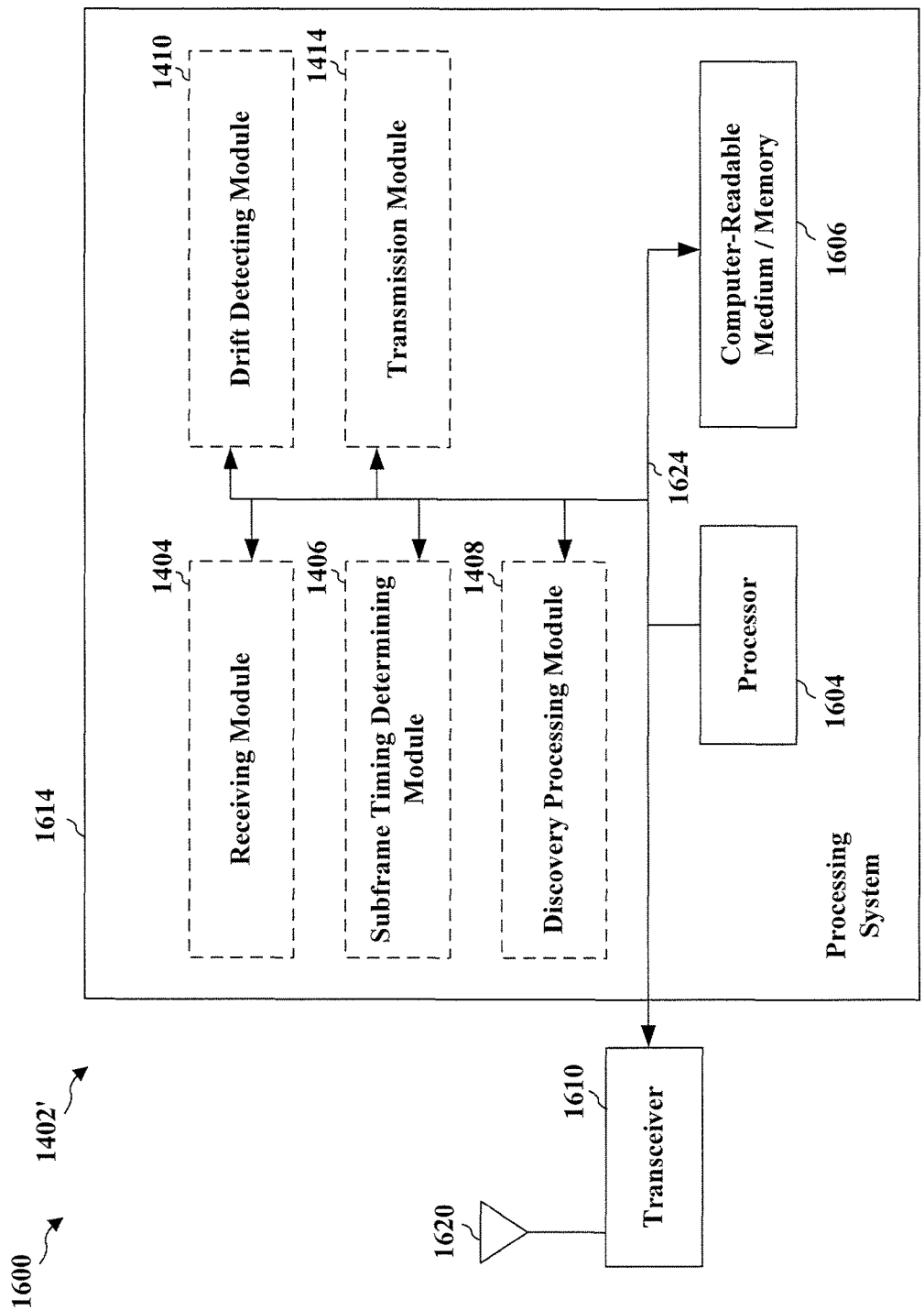
FIG. 16 is a diagram illustrating an example of a hardware implementation for an apparatus employing a processing system.

FIG. 16 is a diagram 1600 illustrating an example of a hardware implementation for an apparatus 1402' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1404, 1406, 1408, 1410, 1412, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1404. In addition, the transceiver 1610 receives information from the processing system 1614, specifically the transmission module 1414, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1404, 1406, 1408, 1410, and 1412. The modules may be software modules running in the processor 1604, resident/stored in the computer readable medium/ memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1402/1402' for wireless communication includes means for means for receiving information from a serving base station and at least one neighboring base station, the information indicating a time allocation of discovery resources allocated by each of the serving base station and the at least one neighboring base station for performing direct discovery, means for determining a subframe timing of the serving base station and the at least one neighboring base station, means for performing direct discovery using the time allocation of the discovery resources allocated by each of the serving base station and the at least one neighboring base station based on a determined subframe timing of the serving base station or a neighboring base station corresponding to the discovery resources, means for detecting a timing drift between the time allocation of the discovery resources corresponding to a base station and the time allocation of the discovery resources corresponding to a neighboring base station, means for reporting the timing drift to the serving base station, means for determining a consensus discovery timing by synchronizing the time allocation of the discovery resources indicated by the received information with a time allocation of discovery resources of at least one other UE performing direct discovery, means for performing the direct discovery based on the consensus discovery timing, means for transitioning from a timing for performing a wide area network (WAN) operation to the consensus discovery timing when transitioning from a WAN resource to the discovery resources.

The aforementioned means may be one or more of the aforementioned modules of the apparatus 1402 and/or the processing system 1614 of the apparatus 1402' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
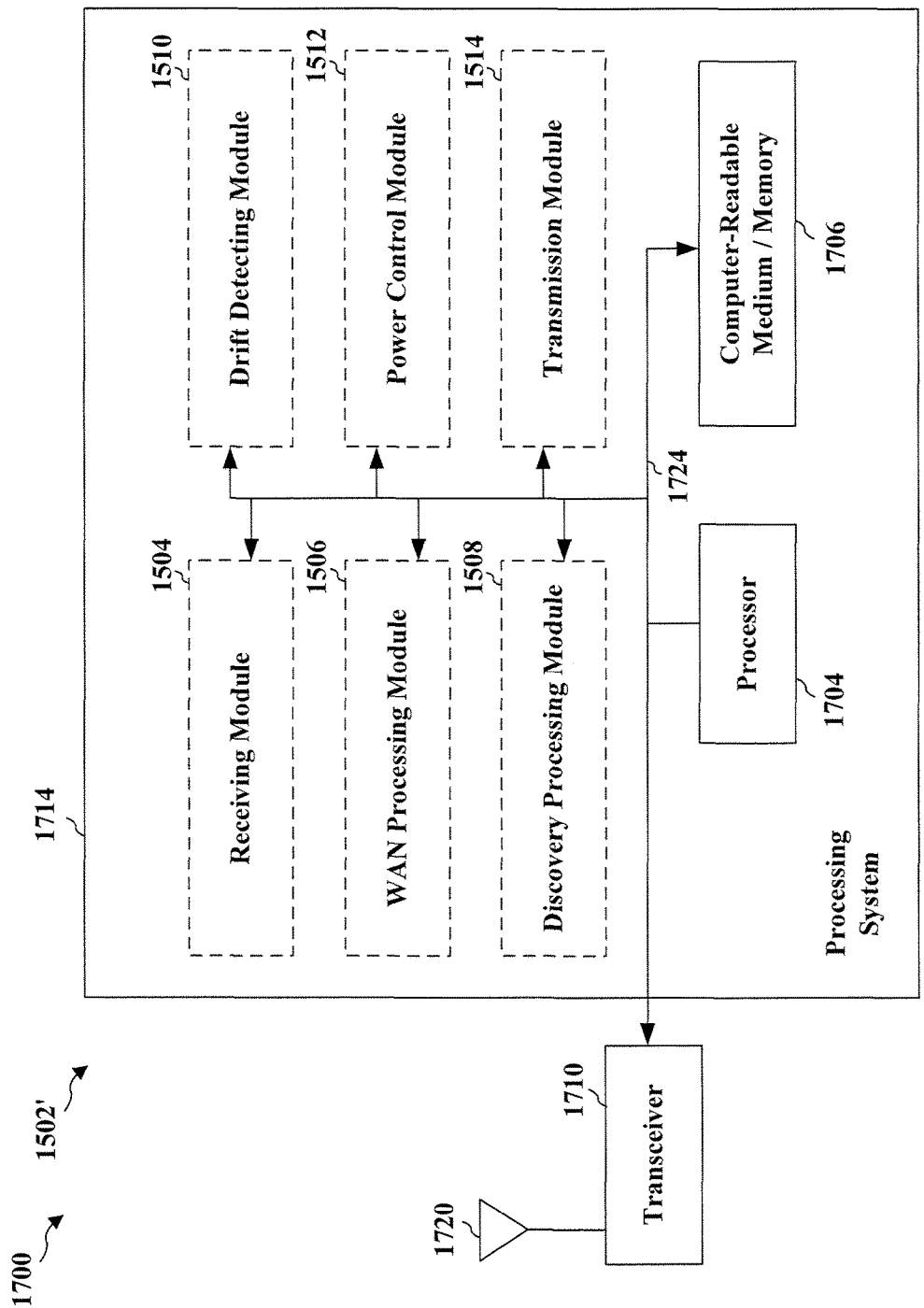
FIG. 17 is a diagram illustrating an example of a hardware implementation for an apparatus employing a processing system.

FIG. 17 is a diagram 1700 illustrating an example of a hardware implementation for an apparatus 1502' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1504, 1506, 1508, 1510, 1512, 1514 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1504. In addition, the transceiver 1710 receives information from the processing system 1714, specifically the transmission module 1514, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1504, 1506, 1508, 1510, 1512, and 1514. The modules may be software modules running in the processor 1704, resident/stored in the computer readable medium/memory 1706, one or more hardware modules coupled to the processor 1704, or some combination thereof. The processing system 1714 may be a component of the eNB 610 and may include the memory 676 and/or at least one of the TX processor 616, the RX processor 670, and the controller/processor 675.

In one configuration, the apparatus 1502/1502' for wireless communication includes means for reserving a time allocation of discovery resources for performing direct discovery, means for sending information indicating the time allocation of the discovery resources to at least one user equipment (UE) served by the base station, wherein the information further indicates the time allocation of discovery resources allocated by at least one neighboring base station for performing direct discovery, means for detecting a timing drift between the time allocation of the discovery resources corresponding to the base station and the time allocation of the discovery resources corresponding to a neighboring base station, means for adjusting the time allocation of the discovery resources corresponding to the base station based on the detected timing drift, means for refraining from scheduling a UE performing a wide area network (WAN) operation in resources that overlap with the discovery resources allocated by the at least one neighboring base station, means for scheduling a UE performing a wide area network (WAN) operation in resources that overlap with the discovery resources allocated by the at least one neighboring base station when the UE is in close proximity to the base station, means for power controlling the scheduled UE to transmit at a power sufficient to compensate for interference from UEs performing direct discovery.

The aforementioned means may be one or more of the aforementioned modules of the apparatus 1502 and/or the processing system 1714 of the apparatus 1502' configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   receiving information from a serving base station and at least one neighboring base station, the information indicating a time allocation of discovery resources allocated by each of the serving base station and the at least one neighboring base station for performing direct peer-to-peer discovery in an asynchronous frequency division duplex (FDD) network between the UE served by the serving base station and one or more neighboring UEs served by the at least one neighboring base station, wherein the serving base station and the at least one neighboring base station are asynchronous;
   determining a reference timing; and
   performing the direct peer-to-peer discovery based on the determined reference timing,
   wherein at least one of the determined reference timing or the performed direct peer-to-peer discovery is based on the received information.

2. The method of claim 1, wherein:
   the determining the reference timing comprises determining a subframe timing of the serving base station and the at least one neighboring base station; and
   the performing the direct peer-to-peer discovery comprises performing the direct peer-to-peer discovery using the time allocation of the discovery resources allocated by each of the serving base station and the at least one neighboring base station based on a determined subframe timing of the serving base station or a neighboring base station corresponding to the discovery resources.

3. The method of claim 2, wherein the discovery resources corresponding to a base station are time-adjacent, non-overlapping, and within one subframe of the discovery resources corresponding to a neighboring base station, and
   wherein the performing the direct peer-to-peer discovery comprises waking once to perform the direct peer-to-peer discovery using each of the allocated discovery resources in a sequential manner according to the time allocation of each of the allocated discovery resources.

4. The method of claim 2, wherein the time allocation of the discovery resources corresponding to a base station is the same as the time allocation of the discovery resources corresponding to a neighboring base station, and
   wherein the performing the direct peer-to-peer discovery comprises waking once to perform the direct peer-to-peer discovery using each of the allocated discovery resources having the same time allocation in a sequential manner.

5. The method of claim 2, further comprising:
   detecting a timing drift between the time allocation of the discovery resources corresponding to a base station and the time allocation of the discovery resources corresponding to a neighboring base station; and
   reporting the timing drift to the serving base station.

6. The method of claim 2, wherein the subframe timing is determined based on at least one of:
   downlink synchronization signals broadcast by the at least one neighboring base station; or
   a transmission from at least one other UE performing direct peer-to-peer discovery, the at least one other UE served by the at least one neighboring base station.

7. The method of claim 2, further comprising:
   tuning to a downlink frequency spectrum of the at least one neighboring base station when determining the subframe timing of the at least one neighboring base station; and
   tuning to an uplink frequency spectrum of the at least one neighboring base station when performing the direct peer-to-peer discovery for at least one other UE served by the at least one neighboring base station.

8. The method of claim 1, wherein:
   the determining the reference timing comprises determining a consensus discovery timing by synchronizing the time allocation of the discovery resources indicated by the received information with a time allocation of discovery resources of at least one other UE performing direct peer-to-peer discovery; and
   the performing the direct peer-to-peer discovery comprises performing the direct peer-to-peer discovery based on the consensus discovery timing.

9. The method of claim 8, further comprising:
   transitioning from a timing for performing a wide area network (WAN) operation to the consensus discovery timing when transitioning from a WAN resource to the discovery resources.

10. The method of claim 8, wherein the discovery resources corresponding to the serving base station:
    coincide with discovery resources corresponding to at least one neighboring base station; and
    are within one subframe of the discovery resources corresponding to the at least one neighboring base station, wherein a blank subframe precedes and follows the time allocation of the discovery resources, and wherein the performing the direct peer-to-peer discovery comprises waking once according to the consensus discovery timing to perform the direct peer-to-peer discovery using the discovery resources corresponding to the serving base station and the at least one neighboring base station.

11. The method of claim 8, further comprising:
detecting a timing drift between the time allocation of the discovery resources corresponding to a base station and the time allocation of the discovery resources corresponding to a neighboring base station; and
reporting the timing drift to the serving base station.

12. The method of claim 8, further comprising:
tuning to a downlink frequency spectrum of the at least one neighboring base station when determining a subframe timing of the at least one neighboring base station; and
tuning to an uplink frequency spectrum of the at least one neighboring base station when performing the direct peer-to-peer discovery for at least one UE served by the at least one neighboring base station.

13. A method of wireless communication at a base station, comprising:
reserving a time allocation of discovery resources for performing direct peer-to-peer discovery in an asynchronous FDD network between at least one user equipment (UE) served by the base station and one or more neighboring UEs served by at least one neighboring base station, wherein the serving base station and the at least one neighboring base station are asynchronous; and
sending information indicating the time allocation of the discovery resources to the at least one UE served by the base station.

14. The method of claim 13, wherein the information further indicates the time allocation of discovery resources allocated by the at least one neighboring base station for performing direct peer-to-peer discovery.

15. The method of claim 14, wherein the discovery resources corresponding to the base station are time-adjacent, non-overlapping, and within one subframe of the discovery resources corresponding to a neighboring base station.

16. The method of claim 14, wherein the time allocation of the discovery resources corresponding to the base station is the same as the time allocation of the discovery resources corresponding to a neighboring base station.

17. The method of claim 14, further comprising:
detecting a timing drift between the time allocation of the discovery resources corresponding to the base station and the time allocation of the discovery resources corresponding to a neighboring base station; and
adjusting the time allocation of the discovery resources corresponding to the base station based on the detected timing drift,
wherein the timing drift is detected via at least one of:
receiving timing information from a neighboring base station via a network backhaul,
receiving a synchronization signal from the neighboring base station via an over-the-air signal, or
receiving a timing drift report from a UE served by the base station.

18. The method of claim 14, further comprising refraining from scheduling a UE performing a wide area network (WAN) operation in resources that overlap with the discovery resources allocated by the at least one neighboring base station.

19. The method of claim 14, further comprising:
scheduling a UE performing a wide area network (WAN) operation in resources that overlap with the discovery resources allocated by the at least one neighboring base station when the UE is in proximity to the base station; and
power controlling the scheduled UE to transmit at a power that compensates for interference from UEs performing direct peer-to-peer discovery.

20. The method of claim 14, wherein the information further indicates a frequency spectrum used by the at least one neighboring base station belonging to a public land mobile network (PLMN) different from a PLMN of the base station.

21. The method of claim 13, wherein the discovery resources corresponding to the base station:
coincide with discovery resources corresponding to the at least one neighboring base station, and
are within one subframe of the discovery resources corresponding to the at least one neighboring base station,
wherein a blank subframe precedes and follows the time allocation of the discovery resources.

22. The method of claim 21, further comprising:
detecting a timing drift between the time allocation of the discovery resources corresponding to the base station and a time allocation of discovery resources corresponding to a neighboring base station; and
adjusting the time allocation of the discovery resources corresponding to the base station based on the detected timing drift,
wherein the timing drift is detected via at least one of:
receiving timing information from a neighboring base station via a network backhaul,
receiving a synchronization signal from the neighboring base station via an over-the-air signal, or
receiving a timing drift report from a UE served by the base station.

23. The method of claim 21, wherein the information further indicates a frequency spectrum used by the at least one neighboring base station belonging to a public land mobile network (PLMN) different from a PLMN of the base station.

24. An apparatus for wireless communication at a user equipment (UE), comprising:
means for receiving information from a serving base station and at least one neighboring base station, the information indicating a time allocation of discovery resources allocated by each of the serving base station and the at least one neighboring base station for performing direct peer-to-peer discovery in an asynchronous FDD network between the UE served by the serving base station and one or more neighboring UEs served by the at least one neighboring base station;
means for determining a reference timing; and
means for performing the direct peer-to-peer discovery based on the determined reference timing,
wherein at least one of the determined reference timing or the performed direct peer-to-peer discovery is based on the received information, and
wherein the serving base station and the at least one neighboring base station are asynchronous.

25. The apparatus of claim 24, wherein:
the means for determining the reference timing is configured to determine a subframe timing of the serving base station and the at least one neighboring base station; and the means for performing the direct peer-to-peer discovery is configured to perform the direct peer-to-peer discovery using the time allocation of the discovery resources allocated by each of the serving base station and the at least one neighboring base station based on a determined subframe timing of the serving base station or a neighboring base station corresponding to the discovery resources.

26. The apparatus of claim 24, wherein:
the means for determining the reference timing is configured to determine a consensus discovery timing by synchronizing the time allocation of the discovery resources indicated by the received information with a time allocation of discovery resources of at least one other UE performing direct peer-to-peer discovery; and
the means for performing the direct peer-to-peer discovery is configured to perform the direct peer-to-peer discovery based on the consensus discovery timing.

27. An apparatus for wireless communication at a base station, comprising:
means for reserving a time allocation of discovery resources for performing direct peer-to-peer discovery in an asynchronous FDD network between at least one user equipment (UE) served by the base station and one or more neighboring UEs served by at least one neighboring base station, wherein the serving base station and the at least one neighboring base station are asynchronous; and
means for sending information indicating the time allocation of the discovery resources to the at least one UE served by the base station.

28. The apparatus of claim 27, wherein the information further indicates the time allocation of discovery resources allocated by the at least one neighboring base station for performing direct peer-to-peer discovery.

29. The apparatus of claim 27, wherein the discovery resources corresponding to the base station:
coincide with discovery resources corresponding to the at least one neighboring base station, and
are within one subframe of the discovery resources corresponding to the at least one neighboring base station,
wherein a blank subframe precedes and follows the time allocation of the discovery resources.

* * * * *